No. 810,444. PATENTED JAN. 23, 1906.
C. W. THEIL.
ELECTRIC DRILL.
APPLICATION FILED JUNE 1, 1903.
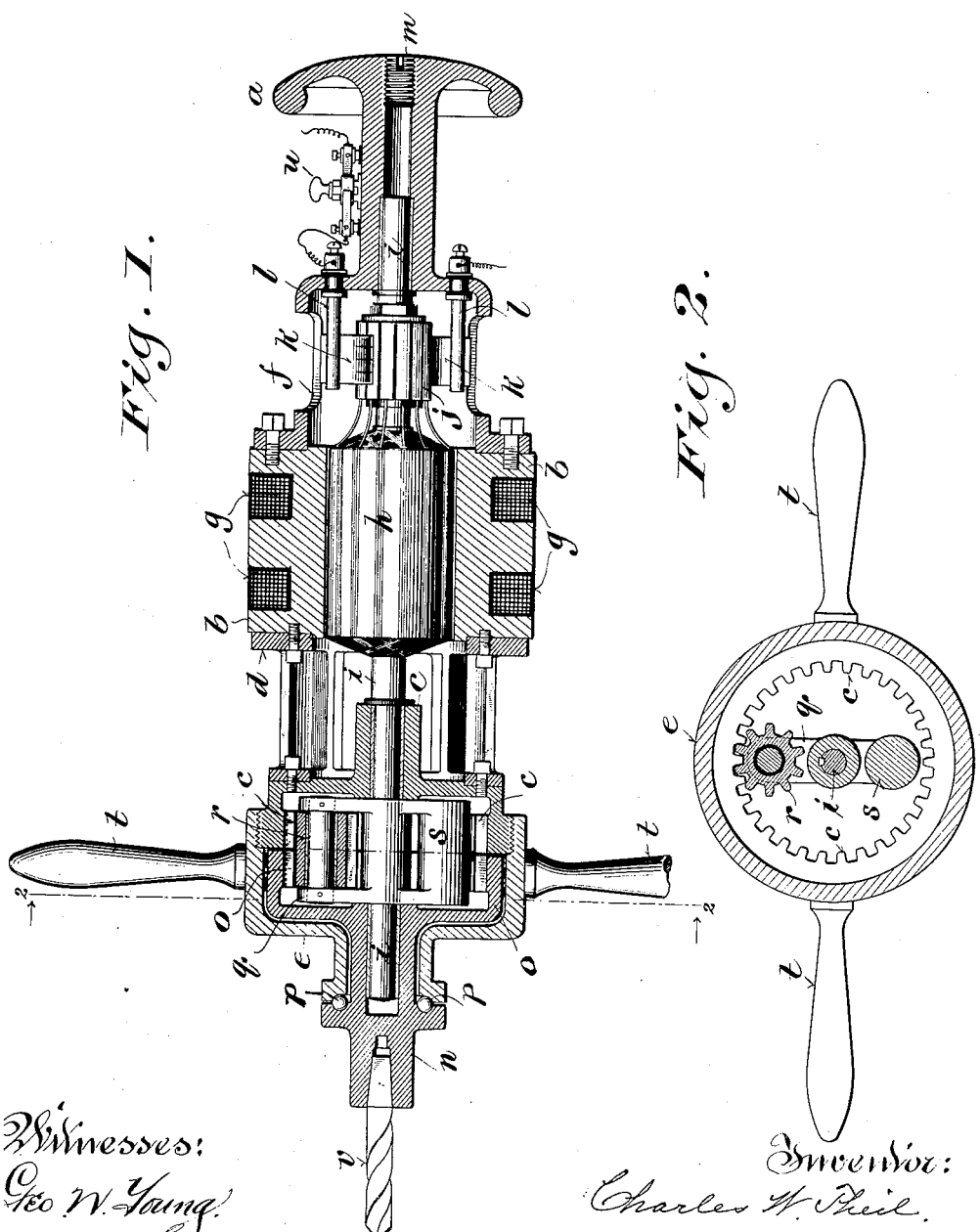

UNITED STATES PATENT OFFICE.

CHARLES W. THEIL, OF MILWAUKEE, WISCONSIN, ASSIGNOR OF ONE-THIRD TO ALONZO D. SEAMAN AND ONE-THIRD TO JOHN T. SEAMAN, OF MILWAUKEE, WISCONSIN.

ELECTRIC DRILL.

No. 810,444. Specification of Letters Patent. Patented Jan. 23, 1906.

Application filed June 1, 1903. Serial No. 159,408.

*To all whom it may concern:*

Be it known that I, CHARLES W. THEIL, a citizen of the United States, residing at Milwaukee, in the county of Milwaukee and State of Wisconsin, have invented certain new and useful Improvements in Electric Drills, of which the following is a specification, reference being had to the accompanying drawings, forming a part thereof.

This invention relates to portable power-drills. Its main objects are to produce a light, powerful, compact, and self-contained electric drill with few and simple parts and generally to improve the construction and operation of drills of this class.

It consists in certain novel features of construction and in the peculiar arrangement and combinations of parts hereinafter particularly described, and pointed out in the claims.

In the accompanying drawings like letters designate the same parts in both figures.

Figure 1 is a medial longitudinal section of an electric breast-drill embodying my invention; and Fig. 2 is a cross-section of the same on the line 2 2, Fig. 1.

The case or frame of the drill is composed of coaxial sections comprising an end bearing and breast-piece $a$, a motor field-piece $b$, an internal gear and bearing piece $c$, connected with the motor field-piece by distance-piece $d$, and an end-thrust bearing-piece $e$, which forms, with the internal gear $c$, a gear-case. These sections are bolted or screwed together, as shown, and their coaxial or central relation to each other is insured by interfitting circular recesses and projections on adjoining parts. The end bearing and breast-piece $a$ is enlarged and made hollow at the end next to the field-piece $b$ to form a housing $f$ for the commutator and brushes of the motor. The field-piece $b$ is provided with suitable coils $g$.

$h$ is the motor-armature, the shaft $i$ of which has bearings in the breast-piece $a$ and in the hub of the gear $c$ and is provided in the housing $f$ with a commutator $j$. The brushes $k\ k$ are supported in the proper relation to the commutator by rods or binding-posts $l\ l$, which are adjustably secured and insulated in the outer end of the housing $f$, parallel with the armature-shaft. The bore in the breast-piece $a$ is extended through the outer end thereof and closed with a screw-plug $m$ to form an oil-receptacle for lubricating the adjacent armature-bearing.

$n$ is a rotary drill chuck or holder formed or provided with an internal gear $o$, the pitch-circle of which preferably corresponds with that of the fixed gear $c$, but which has more or less teeth than said fixed gear.

An end-thrust ball-bearing $p$ is preferably interposed between the end piece $e$ of the case or frame and an outwardly-projecting flange or shoulder on the drill chuck or holder, which also has a central bearing on the end of the armature-shaft $i$, which projects through and beyond the fixed gear $c$.

Between the internal gears $c$ and $o$ a double crank $q$ is fixed on the armature-shaft and is provided on one side thereof with a pinion $r$, meshing with both internal gears and on the other side with a counterweight $s$. The end piece $e$ of the case or frame is provided on opposite sides with handles $t$ for guiding and holding the drill. A switch $u$ for stopping and starting the motor may be conveniently located on the breast-piece $a$, as shown in Fig. 1.

The relative number of teeth of the differential internal gears $c$ and $o$ may be varied according to conditions and requirements.

The machine herein shown and described operates as follows: A drill $v$ being inserted in the chuck or holder $n$, as shown in Fig. 1, and the motor being started by closing the switch $u$, the crank $q$ will be rotated with the armature $h$, carrying the pinion $r$ around the shaft $i$ or axis of the drill in engagement with the fixed and movable internal gears $c$ and $o$, and thereby rotating the pinion in the opposite direction. Assuming that the fixed gear $c$ has thirty teeth, as shown in Fig. 2, and that the movable gear $o$ has thirty-three teeth, or one-tenth more than the gear $c$, the gear $o$ will be advanced one-tenth of a revolution with relation to the fixed gear $c$ to each revolution of the crank, or the movable gear $o$, with the drill-holder $n$ and drill $v$, will be turned one revolution to every ten revolutions of the armature and in the same direction. The relative speed of the drill-holder and armature may be varied as desired by varying the relative number of teeth of the internal gears, and the rotation of the drill may be reversed with relation to the rotation of the armature by providing the fixed gear $c$ with more teeth than the movable gear $o$.

Various changes in the minor details of construction and arrangement of parts may be made without materially affecting the operation of the drill and without departing from the principle and intended scope of my invention.

I claim—

1. In an electric drill the combination with a suitable case or frame, of a motor-armature and a rotary drill-holder mounted coaxially therein, differential internal gears, fixed one to the drill-holder and the other to said case or frame, and a crank fixed to the armature-shaft and provided with a pinion which meshes with both of said internal gears, said drill-holder being rotatable and the case stationary relatively to each other and the armature-shaft, substantially as described.

2. In an electric drill the combination with a suitable case of a motor-armature and a rotary drill-holder mounted coaxially therein, differential internal gears fixed one to the drill-holder and the other to the case or frame, said drill-holder being rotatable and the case stationary relatively to each other and the armature-shaft, and a crank fixed to the armature-shaft and provided on one side thereof with a pinion which meshes with both internal gears and on the other side with a counterweight, whereby motion is transmitted from the armature-shaft to the drill-holder through said pinion and differential gears, substantially as described.

3. In an electric drill the combination of a case or frame composed of coaxial sections comprising a motor field-piece, a fixed internal gear and end bearing-pieces, a drill-holder provided with an internal gear having a different number of teeth from the fixed gear, and a motor-armature provided with an eccentrically-mounted pinion meshing with both internal gears, said drill-holder being rotatable and the case stationary relatively to each other and the armature-shaft, whereby motion is transmitted to the drill-holder from the motor through said pinion and differential gears, substantially as described.

4. In an electric drill the combination with a case or frame provided with coaxial bearings, with a fixed internal gear and with a motor-field, of a motor-armature mounted in said bearings and provided with an eccentrically-mounted pinion meshing with said internal gear, and a rotary drill-holder having a central bearing on the armature-shaft, an end-thrust bearing on the case or frame and an internal gear meshing with said pinion, one of said gears having a different number of teeth from the other, and said drill-holder being rotatable and the case stationary relatively to each other and the armature-shaft, whereby motion is transmitted to the drill-holder from the motor-armature through said pinion and differential gears, substantially as described.

5. In an electric drill the combination of a case or frame composed of coaxial sections comprising a motor-field, a fixed internal gear and end pieces, of a motor-armature having bearings in said case or frame, and provided with an eccentrically-mounted pinion meshing with said gear, and a drill-holder having an end-thrust ball-bearing between it and said case or frame and an internal gear meshing with said pinion, one of said gears having a different number of teeth from the other, and said drill-holder being rotatable and the case stationary relatively to each other and the armature-shaft, whereby motion is transmitted to the drill-holder from the motor-armature through said pinion and differential gears, substantially as described.

In witness whereof I hereto affix my signature in presence of two witnesses.

CHARLES W. THEIL.

Witnesses:
 CHAS. L. GOSS,
 ANNIE SEIDEL.